United States Patent Office 3,842,145
Patented Oct. 15, 1974

1

3,842,145
POLYMERIZATION OF UNSATURATED MONOMERS WITH MULTILITHIUM INITIATORS

Henry L. Hsieh, Bartlesville, Okla., assignor to Phillips Petroleum Company

No Drawing. Original application Jan. 21, 1971, Ser. No. 108,612, now Patent No. 3,725,488. Divided and this application Dec. 21, 1972, Ser. No. 317,160
Int. Cl. C08d *1/32*; C08f *19/06*
U.S. Cl. 260—879 23 Claims

ABSTRACT OF THE DISCLOSURE

Multilithium polymerization initiators are prepared by the metalation of multimethyl-substituted aromatic hydrocarbons with tertiary or secondary alkyl or cycloalkyllithium compounds in hydrocarbon media.

This application is a divisional application of U.S. application Ser. No. 108,612 filed Jan. 21, 1971, now allowed as U.S. Letters Patent 3,725,488, patented Apr. 3, 1973.

FIELD OF THE INVENTION

This invention relates to a multifunctional polymerization initiator. In another aspect, it relates to the product of the reaction of a tertiary or secondary alkyl or cycloalkyllithium compound with a multimethyl-substituted aromatic hydrocarbon. This invention further relates to the preparation of polymers of conjugated dienes and of other polymerizable monomers. In a related aspect, this invention appertains to a process for the use of multilithium polymerization initiators in a process for producing high cis polymers of conjugated dienes.

DESCRIPTION OF THE PRIOR ART

Lithium-containing polymerization initiators are known in the polymerization art. Many such initiators require the use of polar diluents for their preparation, and often are quite unstable in that they cannot be prepared and stored for long intervals without serious loss in activity. The polar diluents are objectionable in many polymerization reactions, affecting undesirably the resulting polymer structure.

Insoluble initiators have been prepared in the past, generally being prepared in the presence of polar materials. Even after repeated washings with non-polar diluents, such initiators still contain sufficient residual polar material to undesirably affect subsequent use in polymerization processes.

Prior art disclosures such as British patent specification 873,656 suggest that compounds such as amyllithium can be reacted with *p*-xylene to produce a *p*-xylene dilithium, with such formation being carried out in a diluent such as a paraffin or aromatic hydrocarbon. This specification further indicates that the alkyllithium compounds are soluble in the hydrocarbon solvents employed in the catalyst preparation, and similarly that the multilithium metalated compounds are generally soluble in such solvents. The catalysts produced according to this specification are used in the polymerization of monomers such as isoprene, though with relatively poor yield, necessitating for a workable process the addition of polar compounds, or Friedel-Crafts compounds, or both.

SUMMARY OF THE INVENTION

Surprisingly, and quite unexpectedly, I have discovered that I can prepare hydrocarbon-insoluble multilithium initiators by the reaction of *sec-* or *tert*-alkyllithium or cycloalkyllithium with a multimethyl-substituted aromatic hydrocarbon. Furthermore, these hydrocarbon-insoluble

2 catalysts so prepared can be dispersed in a hydrocarbon diluent in which they are insoluble, and utilized for the polymerization of conjugated dienes essentially to complete conversion with very high cis content in the resulting polymer. The *n*-alkyl-lithiums distinctly are not suitable for preparation of my catalysts. Furthermore, I do not use and do not want to use a polar compound. Additionally, no other additive, polar compound, Friedel-Crafts compound, or other carrier component, is necessary at all.

My unique catalysts, used in the preparation of conjugated diene polymers, produce polymers with higher cis contents than can be prepared in polymerization systems using polar solvent such as ethers, and, correspondingly, have much lower vinyl contents. My catalysts or initiators are particularly useful for the production of high cis polyisoprene and polybutadiene homopolymers, and copolymers in which the conjugated diene portion has a low vinyl content. Polyisoprene obtained according to my invention has a raw cis content above about 65 per cent and generally above 70 percent.

Thus, I produce a more effective catalyst, more simply, obtain higher yields, i.e., conversion of conjugated diene to polymer, and produce a higher cis content, which is desired, in the polymer product. Furthermore, I can polymerize with my novel initiators other polymerizable monomers.

Thus, it is my object to produce a novel catalyst system. Another object of my invention is to provide a novel process for producing hydrocarbon-insoluble multilithium initiators. A further object of my invention is to provide an improved method of polymerization such as producing high cis polymers of conjugated dienes.

DETAILED DESCRIPTION OF THE INVENTION

My invention involves the production of multilithium derivatives of multimethyl aromatic hydrocarbons. These catalysts are hydrocarbon-insoluble, and are prepared by reacting certain organomonolithium compounds, specifically *sec-* or *tert-* alkyl- or cycloalkyl-monolithium compounds, with an aromatic hydrocarbon containing at least 2 and up to 10 methyl groups, preferably from 3 to 6 methyl groups, per molecule. These lithium reaction products are prepared in the hydrocarbon solvent in which the *sec-* or *tert*-alkyllithium or cycloalkyllithium is soluble, and in which the multimethyl aromatic hydrocarbon also is soluble, but in which the reaction products, my desired catalysts, essentially are insoluble.

The multimethyl aromatic compounds suitable for use in my invention are those compounds containing from 8 to 30 carbon atoms per molecule and, as mentioned above, having from 2 to 10, preferably 3 to 6, methyl groups per molecule. The multimethyl aromatic compounds can have from 1 to 5, preferably 1 to 3, carbocyclic aromatic rings, per molecule. The carbocyclic aromatic rings can be in a fused or condensed configuration, can be separated by one or more single valence bonds, or a combination of both arrangements can be present. These multimethyl aromatic compounds can have other hydrocarbyl substituents in addition to the methyl groups, such as alkyl, cycloalkyl, aralkyl and the like, containing from 2 to 10 carbon atoms per group.

Examples of suitable multimethyl aromatic hydrocarbons include: *p*-xylene; *o*-xylene; mesitylene; durene; hexamethylbenzene; 1,2,4-trimethylbenzene; pentamethylbenzene; 3 - ethyl-5-cyclopentyl-1,2,4-trimethylbenzene; 4 - decyl-1,2,3,5-tetramethylbenzene; 1,4-dimethylnaphthalene; 1,4,5,8-tetramethylnaphthalene; octamethylnaphthalene; 4-pentyl - 1,2,6,7,8-pentamethylnaphthalene; 1-benzyl-2,3,6,7 - tetramethylnaphthalene; 9,10-dimethylanthracene; 1,4,5,8,9,10 - hexamethylanthracene; decamethylanthracene; 1,8 - dicyclohexyl-2,5,9,10-tetramethylanthracene; 1,4,5,8 - tetramethyltetracene; 1,4,6,8,11,13 - hexamethylpentacene; 1,4,7,10 - tetramethylchrysene; 4,4'-dimethylbiphenyl; 4,5,5',8' - tetramethyl - 1,2' - binaphthalene; 3,5,3'',5''-tetramethyl-*p*-terphenyl, and the like.

The organomonolithium compounds employed according to my invention can be represented by the formula RLi wherein R is a *sec*- or *tert*-hydrocarbon radical which is a saturated aliphatic or saturated cycloaliphatic radical containing from 3 to 12, preferably from 4 to 8, carbon atoms, inclusive.

Representative examples of suitable organomonolithium RLi compounds that can be employed include isopropyllithium, *sec*-butyllithium, *tert*-butyl-lithium, *sec*-hexyllithium, *tert*-hexyllithium, *sec*-octyllithium, *tert*-octyllithium, *sec*-decyllithium, *tert*-decyllithium, *sec*-dodecyllithium, *tert*-dodecyllithium, 2,3 - dimethyl-2-butyllithium, 2,4 - diethyl-3-hexyllithium, 2,4-diisopropyl-2-hexyllithium, 2,2,4-triethyl-4-hexyllithium, 4 - phenyl-*sec*-butyllithium, 4-phenyl-*tert*-hexyllithium, cyclohexyllithium, 4-methylcyclohexyllithium, cyclopentyllithium, 3 - phenylcyclopentyllithium, 3-phenylcyclohexyllithium, and the like.

According to my invention, the reaction of an organomonolithium compound with one of the defined multimethyl aromatic hydrocarbons is carried out in an inert nonpolymerizable reaction medium. The reaction medium is a hydrocarbon having from 4 to 10 carbon atoms per molecule, and preferably is one or more of alkanes, cycloalkanes or aromatic compounds, or mixtures thereof. Monoolefinic hydrocarbons having from 4 to 10 carbon atoms also can be employed, when desired, provided these compounds do not polymerize or otherwise react in the presence of the initiators of my invention or the precursors thereof under the reaction conditions employed. Representative examples of suitable hydrocarbon diluents include benzene, toluene, cyclohexane, methylcyclohexane, n-butane, n-hexane, n-heptane, isooctane, n-decane, 1-hexane, 1-octene, 1-decene, cyclohexane, 1-methylcyclohexene, and the like.

The relative amounts of multimethyl aromatic compound and *sec*- or *tert*-alkyl- or cycloalkyl organomonolithium compound employed in preparing my initiator compositions are conveniently expressed in molar quantities. The mole ratio of the organomonolithium compound to the multimethyl aromatic compound generally is at least 2:1, and a slight excess of the organomonolithium compound above this ratio is preferred, for example, a 5 to 15 percent excess. However, even larger amounts can be used, when desired, as for example one mole of organomonolithium per each methyl group in one mole of a multimethyl aromatic compound which contains three or more methyl groups per molecule.

The reaction temperature employed for preparing the initiator compositions generally is in the range of from 0° C. to +150° C. The reaction time varies with the temperature, and generally will be in the range of from about 3 minutes to 200 hours or more. The initiator compositions of my invention preferably are prepared in the presence of an inert atmosphere such as argon, helium, nitrogen, and the like.

The reaction products formed by the reaction described above are polylithium compounds, and are only very slightly soluble, if at all, in the hydrocarbon media and so essentially precipitate as they are formed. The organomonolithium compounds and the multimethyl aromatic compounds each are hydrocarbon soluble, while my reaction products are hydrocarbon insoluble. Hence, my desired catalysts are readily separated from the reaction environment and in particular from any unreacted organomonolithium compound.

At the conclusion of the reaction, the solid catalyst product can be separated by any suitable means such as centrifugation or filtration, washed with a suitable hydrocarbon solvent to remove any traces of unreacted materials, and then stored as desired until used. Or, the solid catalyst then can be dispersed in a suitable hydrocarbon medium, for example, the polymerization diluent, or even a polymerization monomer, until reaction is desired under suitable conditions.

The initiator prepared in its original hydrocarbon can be used without separation steps, where the effects of unreacted soluble organomonolithium are not deleterious, or where the conditions chosen are such that little or no unreacted organomonolithium remains at the end of the reaction interval in preparing the multilithium polymerization initiators according to my invention.

In general, the polymers which can be prepared according to my invention are those of conjugated dienes containing from 4 to 12 carbon atoms, preferably from 4 to 8 carbon atoms, per molecule. When it is desired that the polymer formed exhibit rubbery characteristics, the conjugated diene should be employed as a major amount of the monomer polymerized. The initiator compositions prepared according to this invention are particularly valuable in forming polymers and copolymers of these conjugated dienes. It should be understood, however, that these initiator compositions also can be used when preparing homopolymers or copolymers of vinyl-substituted aromatic compounds, particularly those containing from 8 to 24, preferably from 8 to 12, carbon atoms per molecule; or of polymerizable polar monomers, particularly those containing from 3 to 24 carbon atoms per molecule; or of polymerizable mixtures of any of these. Also, block copolymers can be formed between a conjugated diene and a vinyl-substituted aromatic compound, or the latter and a polar monomer. The polymerization reaction generally is carried out at a temperature ranging from about −100 to +150° C., preferably from about −75 to +75° C. The particular temperature employed will depend both on the monomers and the particular multilithium polymerization initiator employed in preparing the polymers. The pressure employed during polymerization need only be that necessary to maintain the materials substantially in the liquid phase. The amount of multilithium initiator employed during the polymerization will vary depending on the polymer prepared and particularly the molecular weight desired. In general, however, the amount of multilithium initiator employed will range from about 0.1 to 100 milliequivalents of lithium per 100 grams of total monomer, with the preferred range being from 0.25 to 30 milliequivalents of lithium per 100 grams of monomer.

The polymerization reaction of the monomers in the presence of the hydrocarbon insoluble multilithium initiators of my invention is carried out in a suitable hydrocarbon diluent such as benzene, toluene, cyclohexane, methylcyclohexane, xylene, n-butane, n-hexane, n-heptane, isooctane, and the like. Generally, the diluent is selected from hydrocarbons, for example, paraffins, cycloparaffins and aromatics containing from 4 to 10 carbon atoms per molecule. The polymerization reaction preferably is carried out in the presence of an inert atmosphere such as argon, helium, nitrogen or the like.

The unquenched polymer solutions can be treated with various reagents to introduce functional groups replacing the terminal lithium atoms on the polymer molecule resulting from the polymerization itself. For example, a polymer in solution can be contacted with carbon dioxide to replace the lithium atoms with —COOH groups. Other functional groups known to the art and which can be introduced include —SH, —OH, halogen and the like by means known to the art. The polymer products can range from liquids to rubbery materials. The liquid polymers subsequently can be cured to form solids.

The polymers can be compounded by various conventional methods for compounding natural and synthetic rubbers using, for example, a roll mill or a Banbury mixer. Reinforcing agents such as carbon black and mineral fillers, plasticizers, vulcanizing agents, vulcanization accelerators, antioxidants and the like such as have been employed in natural and synthetic rubbers can be used when compounding the rubbery polymers produced according to my invention. The polymers can be blended with other polymers such as natural rubber, other synthetic rubbers, polyolefins such as polyethylene, and the like. The products of the invention are useful as adhesives, potting compounds, sealants, tire tread stocks and for making many types of molded objects.

EXAMPLES

A more comprehensive understanding of my invention can be obtained by referring to the following illustrative examples which are not intended, however, to be unduly limitative of the scope of my invention.

EXAMPLE I

These runs demonstrate that n-alkyllithiums, such as *n*-butyllithium, are not suitable for the preparation of hydrocarbon insoluble multilithium initiators. According to my invention, hydrocarbon insoluble multilithium initiators prepared from other than *n*-alkyl are, in contrast, particularly suited for the polymerization of monomers such as isoprene to a high molecular weight rubbery polymer having a high cis-content.

The results obtained are shown below in direct comparison with runs of the invention which employed a *sec*-alkyllithium in the initiator preparation step.

TABLE I.—INITIATOR PREPARATION RECIPE

| | |
|---|---|
| Amount: | |
| Aromatic hydrocarbon, mmoles | 25 |
| Alkyllithium, mmoles | Variable |
| Cyclohexane, ml | 100 |
| Temperature, ° C | 70 |
| Time, hours | 5 |

| Run number | Aromatic hydrocarbon | Alkyllithium Type | Alkyllithium mMoles |
|---|---|---|---|
| 1 | Mesitylene | *n*-Butyl | 75 |
| 2 | do | *sec*-Butyl | 75 |
| 3 | durene | *n*-Butyl | 100 |
| 4 | do | *sec*-Butyl | 100 |
| 5 | Hexamethylbenzene | *n*-Butyl | 100 |
| 6 [a] | do | *sec*-Butyl | 100 |
| 7 | do | *n*-Butyl | 150 |
| 8 | do | *sec*-Butyl | 150 |

[a] Reacted for 3 hours instead of 5 hours as shown in the recipe above.

Of those runs employing *n*-butyllithium, only Run 7 showed even slight visible evidence of any hydrocarbon insoluble reaction product. A very slight cloudiness was observed in this reaction mixture at the end of the reaction period.

Each of the above initiator preparations was employed for the polymerization of isoprene. The polymerization results are shown in Table II.

TABLE II.—POLYMERIZATION RECIPE

| | |
|---|---|
| Parts, by weight: | |
| Isoprene | 100 |
| Cyclohexane | 780 |
| Initiator, mehm [a] | Variable |
| Temperature, ° C | 70 |
| Time, hours | Variable |

RESULTS

| Run number | Initiator Mehm | Initiator Run No. | Time, hours | Conv., percent | Inherent viscosity | Unsaturation, percent Cis | Unsaturation, percent 3,4 |
|---|---|---|---|---|---|---|---|
| 9 | 10 | 1 | 1.5 | 100 | 0.28 | 62 | 8.6 |
| 10 | 10 | 2 | 6 | 100 | 9.09 | 88 | 5.3 |
| 11 | 5 | 3 | 1.5 | 100 | 0.43 | 59 | 8.7 |
| 12 | 5 | 4 | 6 | 100 | 7.41 | 90 | 5.5 |
| 13 | 8 | 5 | 1.5 | 100 | 0.32 | 61 | 8.5 |
| 14 | 8 | 6 | 16 | 100 | 7.40 | 91 | 5.3 |
| 15 | 15 | 7 | 1.5 | 100 | 0.23 | 60 | 9.1 |
| 16 | 15 | 8 | 6 | 100 | 5.30 | 87 | 6.3 |

[a] Mehm=Milliequivalents of lithium per 100 g. of monomer.

Since conversions were 100% in each run, it is believed that the differences in polymerization times had no effect on molecular weight or cis-content of the polyisoprenes.

The results above clearly demonstrate that *n*-alkyllithiums are not suitable for the preparation of hydrocarbon insoluble multilithium initiators, while the latter, according to my invention, are suitable for the polymerization of isoprene to a high molecular weight, high-cis polyisoprene.

EXAMPLE II

Further runs were made demonstrating the operability of *tert*-alkyllithiums in the preparation of my multilithium compounds according to my invention.

INITIATOR PREPARATION RECIPE

| | | Amount |
|---|---|---|
| Hexamethylbenzene | mmoles | 12.5 |
| *tert*-Butyllithium [1] | mmoles | 76 |
| Cyclohexane | ml | 50 |
| Temperature, ° C | | 70 |
| Time, hours | | 5 |

[1] A 135 M solution in pentane. This solution was mixed with the hexamethylbenzene and the pentane removed under vacuum before the cyclohexane was added to the mixture.

A dark yellow precipitate formed in the reaction mixture. At the end of the reaction period, the supernatant liquid was removed and discarded and the precipitate was dispersed in cyclohexane and employed as the initiator in the polymerization runs shown below.

POLYMERIZATION RECIPE

| | |
|---|---|
| Parts, by weight: | |
| Cyclohexane | 780 |
| Isoprene | 100 |
| Initiator, mehm [a] | Variable |
| Temperature, ° C | 70 |
| Time, hours | 1.5 |

[Charge order.—Cyclohexane, $N_2$ purge, isoprene, initiator, time, terminate]

POLYMERIZATION RESULTS

| Run number | Initiator, mehm | Conversion, percent | Inherent viscosity | Unsaturation, percent Cis | Unsaturation, percent 3,4 |
|---|---|---|---|---|---|
| 17 | 15 | 100 | 2.70 | 76 | 6.6 |
| 18 | 20 | 100 | 2.27 | 76 | 7.2 |

[a] Mehm=Milliequivalents of lithium per 100 g. of monomer.

The above results demonstrate the effectiveness of a *tert*-alkyllithium in preparing the multilithium initiators of my invention, and the further effectiveness of my initiators in the polymerization of a conjugated diene to a high-cis polymer.

Representative examples of suitable conjugated dienes that can be employed in a polymerization process in my invention include the preferred 1,3-butadiene and isoprene; and also compounds such as 1,3-pentadiene, 1,3-octadiene, 4,5-diethyl-1,3-octadiene, and 2-phenyl-1,3-butadiene, and the like. Conjugated dienes containing halogen and alkoxy substituents along the chain also can be employed, such as chloroprene, and 2-ethoxy-3-methyl-1,3-hexadiene. Conjugated dienes can be polymerized alone or in admixture with each other to form copolymers, or block copolymers. Block copolymers can be prepared from two or more conjugated dienes by charging one compound initially, allowing it to polymerize, and then adding a second conjugated diene, and allowing it to polymerize.

In addition to homopolymers and copolymers of conjugated dienes, copolymers of conjugated dienes with other monomers containing a $$CH_2=\overset{|}{C}-$$

group, particularly the vinyl-substituted aromatic compounds, can be made by the process of my invention. The vinyl-substituted aromatic compounds include styrene, 1-vinylnaphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these aromatic monomers include 3-methylstyrene,
4-dodecylstyrene,
4-cyclohexylstyrene,
4-phenylstyrene,
2-ethyl-4-benzylstyrene,
4-(4-phenyl-n-butyl)styrene,
3-(4-n-hexylphenyl)styrene,
4-methoxystyrene,
3,5-diphenoxystyrene,
4-dimethylaminostyrene,
3,6-di-p-tolyl-1-vinylnaphthalene,
6-cyclohexyl-1-vinylnaphthalene,
4,5-diethyl-8-octyl-1-vinylnaphthalene,
8-phenyl-1-vinylnaphthalene,
4-n-propyl-5-n-butyl-2-vinylnaphthalene,
6-benzyl-2-vinylnaphthalene,
4-o-tolyl-2-vinylnaphthalene,
4-methoxy-1-vinylnaphthalene,
6-phenoxy-1-vinylnaphthalene,
3,6-bis-dimethylamino-1-vinylnaphthalene,
7-dihexoxy-2-vinylnaphthalene, and the like. Block or random copolymers of conjugated dienes and vinyl-substituted aromatic compounds can be formed. The presence of a small amount of polar compound encourages random copolymerization between conjugated dienes and vinyl-substituted aromatic compounds.

Block copolymers can also be prepared from conjugated dienes and polar monomers which are introduced after the conjugated diene has polymerized. These polar monomers include vinylpyridines and vinylquinolines such as 2-vinylpyridine,
5-methyl-2-vinylpyridine,
5-cyclohexyl-2-vinylpyridine,
4-phenyl-2-vinylpyridine,
3-benzyl-4-vinylpyridine,
6-methoxy-2-vinylpyridine,
4-phenoxy-2-vinylpyridine,
4-dimethylamino-2-vinylpyridine,
4-vinylquinoline,
3-methyl-4-vinylquinoline,
3-cyclohexyl-4-vinylquinoline,
3-methyl-4-ethoxy-2-vinylquinoline
1-vinylisoquinoline,
4-*tert*-tridecyl-1-vinylisoquinoline,
and the like.
4-*tert*-tridecyl-1-vinylisoquinoline, and the like.

Other polar monomers include acrylic and alkacrylic acid esters, nitriles, and N,N-disubstituted amides, such as methyl acrylate, methyl methacrylate, isopropyl ethacrylate, acrylonitrile, methacrylonitrile, N,N-dimethylacrylamide, N,N - diethylmethacrylamide, and the like. Vinyl furan and N-vinylcarbazole also can be used.

Reasonable variations and modifications of my invention are possible within the scope of this disclosure, yet without departing from the scope and spirit thereof.

I claim:

1. A polymerization process which comprises polymerizing at least one polymerizable monomer comprising a polymerizable conjugated diene, polymerizable monovinyl-substituted aromatic compound, or both, in the presence of the multilithium polymerization initiator prepared by the process comprising admixing in the presence of a hydrocarbon diluent (I) at least one organomonolithium compound which is sec-alkyllithium, tert-alkyllithium, or cycloalkyllithium compound with (II) multimethyl aromatic hydrocarbon compound containing up to 5 carbocyclic rings and only aromatic rings per molecule wherein said multimethyl aromatic hydrocarbon compound contains 2 to 10 methyl groups and a total of 8 to 30 carbon atoms per molecule and in addition thereto can contain hydrocarbyl substituents in addition to said methyl groups selected from the group consisting of alkyl, cycloalkyl, and aralkyl, containing 2 to 10 carbon atoms per group.

2. The polymerization process according to claim 1 wherein said multilithium polymerization initiator is characterized as essentially hydrocarbon-insoluble.

3. The polymerization process according to claim 2 wherein said essentially hydrocarbon insoluble multilithium polymerization initiator is employed in the range of about 0.1 to 100 milliequivalents of lithium per 100 grams of polymerizable monomer charged to the polymerization system.

4. The process according to claim 3 wherein said polymerizable conjugated diene contains 4 to 12 carbon atoms per molecule, and said polymerizable monovinyl-substituted aromatic compound contains 8 to 24 carbon atoms per molecule.

5. The process according to claim 4 wherein said (II) multimethyl aromatic compound further is characterized as having at least one hydrocarbyl substituent containing 2 to 10 carbon atoms per molecule in addition to said multimethyl groups.

6. The process according to claim 4 wherein is employed a mole ratio of said (I) to said (II) of at least about 2:1.

7. The process according to claim 6 wherein is employed an excess of said (I) to the extent of at least about one mole of said (I) per each methyl group per mole of said (II), and wherein said (II) contains at least three methyl groups per molecule.

8. The process according to claim 6 wherein is employed an excess of about 5 to 15 percent excess of said (I) above said mole ratio of 2:1.

9. The process according to claim 6 wherein said hydrocarbon diluent contains 4 to 10 carbon atoms per molecule, and said (I) organomonolithium is represented by RLi wherein R is hydrocarbyl and contains 3 to 12 carbon atoms.

10. The process according to claim 6 wherein said polymerizable monomer comprises at least one conjugated diene containing 4 to 12 carbon atoms per molecule.

11. The process according to claim 10 wherein said (I) is butyllithium said (II) is mesitylene, and said monomer is isoprene.

12. The process according to claim 10 wherein said (I) is sec-butyllithium, said (II) is durene, and said monomer is isoprene.

13. The process according to claim 10 wherein said (I) is sec-butyllithium, said (II) is hexamethylbenzene, and said monomer is isoprene.

14. The process according to claim 10 wherein said (I) is tert-butyllithium, said (II) is hexamethylbenzene, and said polymerizable monomer is isoprene.

15. The process according to claim 1 wherein said polymerizable monomer comprises said polymerizable conjugated diene and further at least one polar monomer, and the resulting product from said polymerization is a block copolymer of conjugated diene and said polar monomer.

16. The process according to claim 15 wherein said polar monomer is a vinylpyridine or vinylquinoline, acrylic or alkacrylic ester, nitrile, N,N-disubstituted amide, vinyl furan, or N-vinylcarbazole.

17. The process according to claim 6 wherein said polymerizable monomer comprises at least one conjugated diene and at least one monovinyl-substituted aromatic compound, and wherein the product of said polymerization product is a copolymer of said conjugated diene and said monovinyl-substituted aromatic compound.

18. The process according to claim 9 wherein said polymerization process is conducted in the presence of a hydrocarbon polymerization diluent of 4 to 10 carbon atoms per molecule, and wherein said polymerization process is conducted at a polymerization temperature of about −100 to +150° C., at a pressure sufficient to maintain reactants substantially in the liquid phase, and employing an inert atmosphere.

19. The process according to claim 1 wherein said multimethyl aromatic hydrocarbon is *p*-xylene; *o*-xylene; mesitylene; durene; hexamethylbenzene; 1,2,4-trimethylbenzene; pentamethylbenzene; 3-ethyl-5-cyclopentyl-1,2,4-trimethylbenzene; 4-decyl-1,2,3,5-tetramethylbenzene; 1,4-dimethylnaphthalene; 1,4,5,8-tetramethylnaphthalene; octamethylnaphthalene; 4-pentyl-1,2,6,7,8-pentamethylnaphthalene; 1-benzyl-2,3,6,7-tetramethylnaphthalene; 9,10-dimethylanthracene; 1,4,5,8,9,10 - hexamethylanthracene; decamethylanthracene; 1,8-dicyclohexyl - 2,5,9,10 - tetramethylanthracene; 1,4,5,8-tetramethyltetracene; 1,4,6,8,11,13-hexamethylpentacene; 1,4,7,10 - tetramethylchrysene; 4,4′ - dimethylbiphenyl; 4,5,5′,8′-tetramethyl-1,2′-binaphthalene; or 3,5,3″,5″-tetramethyl-*p*-terphenyl.

20. The process according to claim 9 wherein said organomonolithium compound is isopropyllithium, *sec*-butyllithium, *tert*-butyllithium, *sec*-hexyllithium, *tert*-hexyllithium, *sec*-octyllithium, *tert*-octyllithium, *sec*-decyllithium, *tert*-decyllithium, *sec*-dodecyllithium, *tert*-dodecyllithium, 2,3-dimethyl-2-butyllithium, 2,4-diethyl-3-hexyllithium, 2,4-diisopropyl-2-hexylylithium, 2,2,4-triethyl-4-hexyllithium, 4-phenyl-*sec*-butyllithium, 4-phenyl-*tert*-hexyllithium, cyclohexyllithium, 4-methylcyclohexyllithium, cyclopentyllithium, 3-phenylcyclopentyllithium, or 3-phenylcyclohexyllithium.

21. The process according to claim 4 wherein said polymerizable conjugated diene is 1,3-butadiene, isoprene, 1,3-pentadiene, 1,3-octadiene, 4,5-diethyl-1,3-octadiene, 2-phenyl-1,3-butadiene, chloroprene, or 2-ethoxy-3-methyl-1,3-hexadiene.

22. The process according to claim 4 wherein said monovinyl-substituted aromatic compound is styrene, 1-vinylnaphthalene, 2-vinylnaphthalene, 3-methylstyrene, 4-dodecylstyrene, 4-cyclohexylstyrene, 4-phenylstyrene, 2-ethyl-4-benzylstyrene, 4-(4-phenyl-n-butyl)styrene, 3-(4-n-hexylphenyl)styrene, 4 - methoxystyrene, 3,5-diphenoxystyrene, 4-dimethylaminostyrene, 3,6-di-p-tolyl - 1 - vinylnaphthalene, 6-cyclohexyl-1-vinylnaphthalene, 4,5-diethyl-8-octyl-1-vinylnaphthalene, 8 - phenyl-1-vinylnaphthalene, 4-n-propyl-5-n-butyl-2-vinylnaphthalene, 6-benzyl-2-vinylnaphthalene, 4-o-tolyl-2-vinylnaphthalene, 4-methoxy-1-vinylnaphthalene, 6-phenoxy-1-vinylnaphthalene, 3,6-bis-dimethylamino-1-vinylnaphthalene, or 7-dihydroxy-2-vinylnaphthalene.

23. The process according to claim 15 wherein said polar monomer is 2-vinylpyridine, 5-methyl-2-vinylpyridine, 5 - cyclohexyl-2-vinylpyridine, 4-phenyl-2-vinylpyridine, 3-benzyl-4-vinylpyridine, 6-methoxy-2-vinylpyridine, 4-phenoxy-2-vinylpyridine, 4 - dimethylamino-2-vinylpyridine, 4-vinylquinoline, 3-methyl-4-vinylquinoline, 3-cyclohexyl-4-vinylquinoline, 3-methyl-4-ethoxy - 2 - vinylquinoline, 1-vinylisoquinoline, 4-*tert*-tridecyl - 1 - vinylisoquinoline, methylacrylate, methylmethacrylate, isopropylethacrylate, acrylonitrile, methacrylonitrile, n,n-dimethylacrylamide, n,n-diethylmethacrylamide, vinyl furan, or N-vinylcarbazole.

References Cited

UNITED STATES PATENTS

| | | | |
|---|---|---|---|
| 3,652,516 | 3/1972 | Farrar | 260—94.2 |
| 3,725,488 | 4/1973 | Hsieh | 260—94.2 |

JAMES A. SEIDLECK, Primary Examiner

U.S. Cl. X.R.

260—83.7, 93.5 R, 94.2 M, 880 B